(12) United States Patent
Sato

(10) Patent No.: US 10,458,126 B2
(45) Date of Patent: Oct. 29, 2019

(54) FLOOR COVERING

(71) Applicant: TOLI Corporation, Itami-shi, Hyogo-ken (JP)

(72) Inventor: Yuichi Sato, Itami (JP)

(73) Assignee: TOLI CORPORATION, Itami-Shi (JP)

( * ) Notice: Subject to any disclaimer, the term of this patent is extended or adjusted under 35 U.S.C. 154(b) by 175 days.

(21) Appl. No.: 15/093,265

(22) Filed: Apr. 7, 2016

(65) Prior Publication Data

US 2017/0030091 A1 Feb. 2, 2017

(30) Foreign Application Priority Data

Jul. 29, 2015 (JP) ................. 2015-149509

(51) Int. Cl.
*E04F 15/10* (2006.01)
*C08K 5/103* (2006.01)
(Continued)

(52) U.S. Cl.
CPC ............ *E04F 15/107* (2013.01); *B32B 5/022* (2013.01); *B32B 5/024* (2013.01); *B32B 7/12* (2013.01);
(Continued)

(58) Field of Classification Search
CPC ........ B32B 17/10605; B32B 17/10733; B32B 2255/26; B32B 2260/021; B32B 2262/0276; B32B 2307/718; B32B 2307/754; B32B 2419/04; B32B 2451/00; B32B 2471/00; B32B 27/12; B32B 27/22; B32B 27/304; B32B 27/38; B32B 5/022;
(Continued)

(56) References Cited

U.S. PATENT DOCUMENTS 3,501,370 A * 3/1970 Juredine .............. D06N 3/0061
428/318.6
5,627,231 A * 5/1997 Shalov ..................... B05D 1/28
524/284
(Continued)

FOREIGN PATENT DOCUMENTS

JP 61-29629 B2 7/1986
JP 3-231846 A 10/1991
(Continued)

OTHER PUBLICATIONS

Office Action issued in corresponding Japanese Application No. 2015-149509 dated May 7, 2018.
(Continued)

*Primary Examiner* — John D Freeman
(74) *Attorney, Agent, or Firm* — Birch, Stewart, Kolasch & Birch, LLP

(57) ABSTRACT

A floor covering including: a floor covering main body and a surface layer provided on the floor covering main body, wherein the surface layer contains a thermoplastic resin and a plasticizer in an amount of from 20 to 50 parts by mass based on 100 parts by mass of the thermoplastic resin, wherein the plasticizer contains a benzoic acid ester-based plasticizer in an amount of from 10 to 80% by mass. According to the present invention, a floor covering having excellent workability and anti-soiling property can be provided.

2 Claims, 1 Drawing Sheet

(51) Int. Cl.
| | |
|---|---|
| *C08K 5/11* | (2006.01) |
| *C08K 5/12* | (2006.01) |
| *B32B 27/22* | (2006.01) |
| *B32B 27/30* | (2006.01) |
| *C08K 5/101* | (2006.01) |
| *B32B 17/10* | (2006.01) |
| *B32B 27/38* | (2006.01) |
| *B32B 5/02* | (2006.01) |
| *B32B 7/12* | (2006.01) |
| *B32B 9/00* | (2006.01) |
| *B32B 27/12* | (2006.01) |
| *C08L 27/06* | (2006.01) |
| *C08L 91/00* | (2006.01) |

(52) U.S. Cl.
CPC ........ *B32B 9/002* (2013.01); *B32B 17/10605* (2013.01); *B32B 17/10733* (2013.01); *B32B 27/12* (2013.01); *B32B 27/22* (2013.01); *B32B 27/304* (2013.01); *B32B 27/38* (2013.01); *C08K 5/101* (2013.01); *C08K 5/103* (2013.01); *C08K 5/11* (2013.01); *C08K 5/12* (2013.01); *C08L 27/06* (2013.01); *C08L 91/00* (2013.01); *E04F 15/105* (2013.01); *B32B 2255/26* (2013.01); *B32B 2260/021* (2013.01); *B32B 2262/0276* (2013.01); *B32B 2307/718* (2013.01); *B32B 2307/754* (2013.01); *B32B 2419/04* (2013.01); *B32B 2451/00* (2013.01); *B32B 2471/00* (2013.01); *C08K 2201/014* (2013.01)

(58) Field of Classification Search
CPC ........... B32B 5/024; B32B 7/12; B32B 9/002; C08K 5/10–103; C08K 2201/014; C08L 27/06; C08L 91/00; E04F 15/105; E04F 15/107
See application file for complete search history.

(56) References Cited

U.S. PATENT DOCUMENTS 5,990,214 A * 11/1999 Arendt ................... C07C 69/76
524/296
2007/0037926 A1 2/2007 Olsen et al.
2008/0076861 A1 3/2008 Strepka et al.

FOREIGN PATENT DOCUMENTS

| JP | 6-299025 A | 10/1994 |
|---|---|---|
| JP | 7-304919 A | 11/1995 |
| JP | 7-310291 A | 11/1995 |
| JP | 2891684 B2 | 5/1999 |
| JP | 2002-020164 | 1/2002 |
| JP | 2013-76096 A | 4/2013 |
| JP | 5442992 B2 | 3/2014 |
| JP | 5803075 B2 | 10/2014 |
| JP | 2015-10426 A | 1/2015 |

OTHER PUBLICATIONS

Japanese Office Action, dated Oct. 29, 2018, for Japanese Application No. 2015-149509.

* cited by examiner

FLOOR COVERING

FIELD OF THE INVENTION

The present invention relates to a floor covering.

BACKGROUND OF THE INVENTION

Conventionally, various kinds of floor coverings have been widely used. Since floor coverings are stepped on by foot soles and shoe soles, the floor coverings are more likely to be damaged and more likely to be soiled. For this reason, the properties of the floor coverings are desired to have damage resistance and anti-soiling property. In addition, the floor coverings are desired to have not only these properties but also flexibility from the viewpoint of workability. In view of the above, as a layer of a surface side of a floor covering that contacts foot soles or shoe soles, the layer that enhances properties such as anti-soiling property to a synthetic resin layer, or the like has been proposed. The term damage resistance as used herein means a property of being hardly likely to cause damages of scraping on a surface of a floor covering, and the term anti-soiling property means a property of being hardly likely to be soiled, or a property capable of easily removing soils.

Patent Publication 1 discloses an anti-slipping floor covering having excellent anti-soiling property, characterized in that the floor covering comprises a decorative layer containing colored synthetic resin granules formed on a synthetic resin layer including an inorganic and/or organic fiber sheet installed therein, and a transparent or semitransparent anti-soiling synthetic resin layer formed on the decorative layer, wherein the floor covering comprises bumpiness that reaches to the decorative layer from a surface of the anti-soiling synthetic resin layer.

In addition, Patent Publication 2 discloses a vinyl chloride-based resin composition having anti-soiling ability, characterized in that the resin composition contains a plasticizer, wherein the plasticizer contains a texanol isobutyrate and/or benzoic acid ester-based plasticizer in a proportion of from 50 to 100% by weight as an anti-soiling plasticizer, and the patent publication discloses that the resin composition can be used as a surface layer of the floor covering.

PRIOR ART PUBLICATIONS

Patent Publications

Patent Publication 1: Japanese Patent Laid-Open No. Hei-7-310291
Patent Publication 2: Japanese Patent Laid-Open No. Hei-7-304919

SUMMARY OF THE INVENTION

Problems to be Solved by the Invention

However, in Patent Publications 1 and 2, in a case where a plasticizer is used in a large amount, the plasticizer may ooze out, so-called bleed-out. When the bleed-out takes place, the soils are more likely to be deposited on the floor covering which can cause some disadvantages such as worsening of anti-soiling property of the floor covering. In addition, if a plasticizer is reduced to a smaller amount in order to inhibit the bleed-out, flexibility of the floor covering is impaired, so that the workability may be lowered.

An object of the present invention is to provide a floor covering which has excellent workability and anti-soiling property.

Means to Solve the Problems

The present invention relates to a floor covering containing:
a floor covering main body and a surface layer provided on the floor covering main body,
wherein the surface layer contains a thermoplastic resin and a plasticizer in an amount of from 20 to 50 parts by mass based on 100 parts by mass of the thermoplastic resin,
wherein the plasticizer contains a benzoic acid ester-based plasticizer in an amount of from 10 to 80% by mass.

Effects of the Invention

According to the present invention, a floor covering having excellent workability and anti-soiling property can be provided.

MODES FOR CARRYING OUT THE INVENTION

Figure 1:
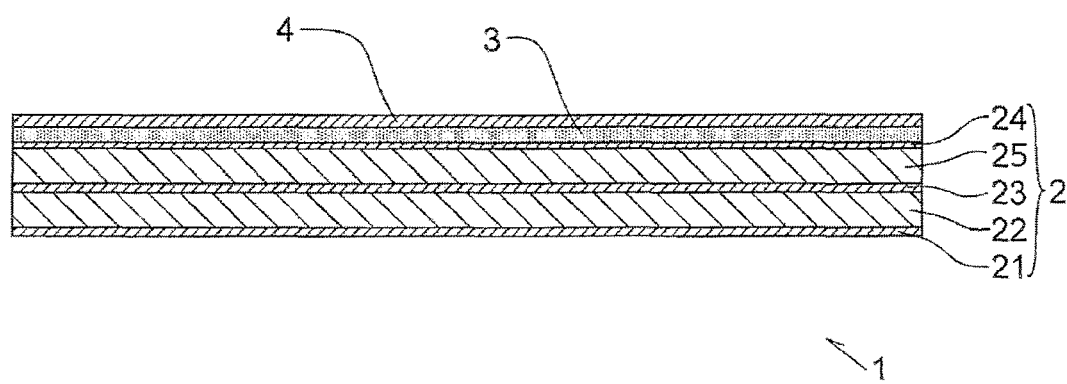
FIG. 1 is a schematic cross-sectional view showing one embodiment of a floor covering according to the present invention.

As a result of studying the above object, it has been found that bleed-out can be inhibited while maintaining flexibility that does not cause any problems in workability, and anti-soiling property is also excellent by having a total amount of plasticizers in a surface layer in smaller amounts, and including a benzoic acid ester-based plasticizer in the plasticizer in a desired proportion. The present inventors have made intensive studies based on the findings, and the present invention has been perfected thereby.

The floor covering of the present invention includes a floor covering main body, and a surface layer provided on the floor covering main body.

As the floor covering main body, a known one in this art can be used. The floor covering main body includes, for example, structures having optional combinations of a basal layer, a resin layer, a shape stabilization layer, a decorative layer, and the like. In addition, the floor covering may further include a surface protective layer provided on a surface layer. As a matter of course, the present invention is not limited to these structures. The present invention may take various embodiments within the scope that does not depart from the gist of the present invention. For example, the floor covering may further include a layer other than those mentioned above.

One embodiment of the floor covering according to the present invention will be explained by referring to FIG. 1. The floor covering 1 includes a floor covering main body 2, a surface layer 3 provided on the floor covering main body 2, and a surface protective layer 4 provided on the surface layer 3. The floor covering main body 2 includes a basal layer 21, a lower resin layer 22 provided on the basal layer 21, a shape stabilization layer 23 provided on the lower resin layer 22, an upper resin layer 25 provided on the shape stabilization layer 23, and a decorative layer 24 provided on the upper resin layer 25.

In addition, the floor covering main body 2 may take a constitution without including either one of an upper resin layer 25 and a lower resin layer 22, or may take a constitution without including a basal layer 21. Especially, the floor covering main body 2 taking the constitution without having an upper resin layer 25 is preferably used. By this constitution, a shape stabilization layer 23 can be positioned at a nearly mid area of the entire thickness of the floor covering 1, so that the bowing of the floor covering 1 can be inhibited.

The term top or upper as used herein refers to a side distal from the floor side when the floor covering is placed over the floor side, and is also called a front side. In addition, the term bottom or lower refers to a side proximal to the floor side when the floor covering is placed over the floor side, and is also called a back side.

Each of the elements will be explained hereinbelow,

The content of the component as used herein refers to a total amount in a case where two or more kinds of the same component are used.

The floor covering main body 2 is a main part which constitutes strength and weight of the floor covering.

It is preferable that the floor covering main body 2 contains a resin layer containing a synthetic resin component, which may include other layers using a synthetic resin in place of a resin layer. In addition, the floor covering main body 2 may optionally contain a basal layer 21, a shape stabilization layer 23, a decorative layer 24, or the like. Here, the resin layer may be a single layer, or a plural layers including an upper resin layer 25 and a lower resin layer 22 or the like as shown in FIG. 1.

The synthetic resin component of the resin layer is not particularly limited, and a thermoplastic resin is preferred. The thermoplastic resin includes vinyl chloride resins, olefin resins, vinyl acetate resins, acrylic resins, amide resins, ester resins, various elastomers, rubbers, and the like, and vinyl chloride resin is preferred from the viewpoint of processability, flexibility, and costs. The synthetic resin component may be used alone or in two or more kinds.

As the vinyl chloride resins, paste-form vinyl chloride resins, suspension vinyl chloride resins, and the like are used.

The paste-form vinyl chloride resin is, for example a paste-like vinyl chloride resin obtained by emulsion polymerization method, and its viscosity can be properly adjusted with a plasticizer. The paste-form vinyl chloride resin is a fine powder having a particle size of from 0.1 to 10 μm, and preferably from 1 to 3 μm, and composed of a large number of fine particle aggregates, and it is preferable that a surfactant is coated on a surface of the above fine powder. It is preferable that the paste-form vinyl chloride resin has an average degree of polymerization of from 1,000 to 2,000 or so.

The suspension vinyl chloride resin is, for example, a vinyl chloride resin obtained by suspension polymerization method. The suspension vinyl chloride resin is a fine powder having a particle size of preferably from 20 μm to 100 μm. The suspension vinyl chloride resin has an average degree of polymerization of preferably from 700 to 1,500 or so, more preferably from 700 to 1,100 or so, and even more preferably from 700 to 1,000 or so. Here, the above particle size is a median size $D_{50}$ in the particle size distribution on volume basis.

Each of the above vinyl chloride resin preferably has a K value of from 60 to 95 or so, and more preferably a K value of from 65 to 80 or so.

The foaming fold of the above foamable resin layer is, but not particularly limited to, preferably from 1.05 folds to 10 folds, and more preferably from 1.1 folds to 4 folds, The content of the synthetic resin component of the resin layer is, but not particularly limited to, preferably from 5 to 50% by mass, more preferably from 10 to 40% by mass, and even more preferably from 15 to 35% by mass, The resin layer can optionally contain an additive, and the additive includes fillers, plasticizers, flame retardants, stabilizers, antioxidants, lubricants, colorants, blowing agents, and the like.

The viscosity as used herein can be measured with a viscometer under the trade name of "Viscotesta" manufactured by RION Co., Ltd.

The resin layer may be non-foamable or may be foamed. In a case where the resin layer is foamed, the foaming fold is preferably 1.05 folds or more, and more preferably 1.1 folds or more, from the viewpoint of enhancing excellent cushioning property to the floor covering, and the foaming fold is preferably 10 folds or less, and more preferably 5 folds or less, from the viewpoint of inhibiting the floor covering from being too soft. In other words, the foaming fold of the resin layer is preferably from 1.05 to 10 folds, and more preferably from 1.1 to 5 folds.

In a case where the resin layer includes plural resin layers including an upper resin layer 25 and a lower resin layer 22 or the like as shown in FIG. 1, the physical properties of the resin layers, such as materials, the presence or absence of foaming, and thickness, may each be identical or different.

The basal layer 21 is a layer positioned at a lowest side of the floor covering 1, which is a layer intended for enhancing adhesive strength with an adhesive for adhering a floor covering to a floor side upon placement (hereinafter referred to as a floor side adhesive), and inhibiting bowing of the floor covering 1. Therefore, when placing a floor covering 1, a bottom side of the basal layer 21 would be mainly contacting the floor side. However, other layers such as a backing layer can be laminated on a bottom side of the basal layer 21, and the lowest side of the floor covering 1 of such a layer constitution would not be constructed by the basal layer 21. The basal layer 21 is optionally provided.

As the basal layer 21, for example, a conventionally known sheet material such as nonwoven fabrics, woven fabrics, paper, or felt can be used without particular limitations. The materials of the fibers constituting the nonwoven fabrics or woven fabrics include, but not particularly limited to, for example, synthetic resin fibers such as polyesters and polyolefins; inorganic fibers such as glass and carbon; natural fibers, and the like.

Since a basal layer 21 is provided, the floor side adhesive is sufficiently impregnated in the basal layer 21 of the floor covering 1 upon placement of the floor covering 1, so that the floor covering 1 is firmly fixed by an anchoring effect. In addition, at least a part of the fibers of the basal layer 21 would be exposed from the lowest side of the floor covering 1 by arranging the basal layer 21 to the lowest layer, so that the above floor side adhesive is intertwined with the fibers, and the floor covering 1 would be more firmly fixed on the floor side.

The above woven fabrics are, but not particularly limited to, preferably cheesecloth, from the viewpoint of various physical properties such as dimensional stability, and further plain woven fabrics of polyester fibers is more preferred. The above cheesecloth is woven fabrics made of fibers such as polyester fibers. Since the woven fabrics include fibers woven thereinto in a cloth form, the woven fabrics are less likely to be stretched along the longitudinal and transverse directions as compared to the nonwoven fabrics, so that the stretching of the floor covering 1 can be effectively inhibited. Therefore, since a basal layer 21 is constituted by woven fabrics, a floor covering 1 having a smaller bowing can be obtained without increasing the overall rigidity.

The above nonwoven fabrics include spun-bond nonwoven fabrics, thermal bond nonwoven fabrics, chemical bond nonwoven fabrics, needle-punch nonwoven fabrics, spun-lace nonwoven fabrics, and the like. These nonwoven fabrics can be used alone or in a combination of two or more kinds. Among them, spun-bond nonwoven fabrics are preferred, because of being thin and strong, and further polypropylene spun-bond nonwoven fabrics are more preferred.

The materials of the fibers constituting nonwoven fabrics and woven fabrics include, but not particularly limited to, synthetic resin fibers, inorganic fibers, natural fibers, and the like. The synthetic resin fibers include polyesters, polyolefins, and the like, and the inorganic fibers include glass, carbon, and the like.

The basis weight of the nonwoven fabrics is, but not particularly limited to, preferably from 20 to 50 g/m$^2$.

The thickness of the basal layer 21 is, but not particularly limited to, preferably from 0.1 to 0.5 mm, and more preferably from 0.2 to 0.4 mm.

The thickness and the basis weight of the basal layer 21 are preferably large to some extent, from the viewpoint of sufficiently inhibiting the bowing of the floor covering 1, and on the other hand, the thickness and the basis weight are preferably not too large, from the viewpoint of sufficiently impregnating resin materials of the lower resin layer 22 in the basal layer 21.

The shape stabilization layer 23 is a layer for inhibiting the dimensional change of the floor covering due to shrinkage or expansion with the passage of time. It is preferable that the shape stabilization layer 23 is provided at nearly the central position of the entire thickness of the floor covering 1. Since the shape stabilization layer 23 is provided at this position, the dimensional stability of the floor covering is increased, and the bowing of the end part of the floor covering can be inhibited. For example, the shape stabilization layer 23 may be, as shown in FIG. 1, provided between the resin layers, or provided at a front side relative to the resin layer.

The shape stabilization layer 23 includes nonwoven fabrics or woven fabrics, and the like.

The materials of the fibers constituting nonwoven fabrics and woven fabrics include, but not particularly limited to, synthetic resin fibers, inorganic fibers, natural fibers, and the like. The synthetic resin fibers include polyesters, polyolefins, and the like, the inorganic fibers include glass, carbon, and the like, and the natural fibers include pulp, and the like. The glass fibers are preferably used, from the viewpoint of dimensional stability, and, for example, glass fiber nonwoven fabrics, so-called glass-mat, or glass fiber woven fabrics, so-called glass cloth, are preferred.

The materials of the fibers may be used alone, or in two or more kinds of a mixture of glass fibers and pulp, and the like.

The basis weight of the nonwoven fabrics or woven fabrics is, but not particularly limited to, preferably 10 g/m$^2$ or more, and more preferably 20 g/m$^2$ or more, from the viewpoint of improving dimensional stability of the floor covering, and the basis weight is preferably 100 g/m$^2$ or less, and more preferably 50 g/m$^2$ or less, from the viewpoint of securing proper flexibility and processability. In other words, the basis weight of the nonwoven fabrics or woven fabrics is preferably from 10 to 100 g/m$^2$, and more preferably from 20 to 50 g/m$^2$.

The thickness of the shape stabilization layer 23 is, but not particularly limited to, preferably 0.1 mm or more, more preferably 0.15 mm or more, and even more preferably 0.2 mm or more, from the viewpoint of improving dimensional stability of the floor covering, and the thickness is preferably 0.5 mm or less, more preferably 0.4 mm or less, and even more preferably 0.35 mm or less, from the viewpoint of securing proper flexibility and processability. In other words, the thickness of the shape stabilization layer 23 is preferably from 0.1 to 0.5 mm, more preferably from 0.15 to 0.4 mm, and even more preferably from 0.20 to 0.35 mm, The decorative layer 24 is a layer for enhancing designing property to the floor covering. It is preferable that the decorative layer 24 is provided on a surface side of the floor covering main body 2.

The decorative layer 24 is not particularly limited so long as the layer enhances designing property, and, for example, those formed by a thermoplastic resin or the like to allow the design printing to transfer to a surface, or those that are colored are preferred. The thermoplastic resin includes vinyl chloride resins, olefin resins, vinyl acetate resins, acrylic resins, amide resins, ester resins, various elastomers, rubbers, and the like. The vinyl chloride resins are preferred, from the viewpoint of cohesion with the surface layer 3.

The thickness of the decorative layer 24 is, but not particularly limited to, preferably from 0.01 to 1 mm, and more preferably from 0.01 to 0.8 mm, The surface layer 3 is a layer that enhances durability, wear resistance, and scratching resistance to the floor covering. In addition, in a case where a surface protective layer 4 is further provided on a surface layer 3, the surface layer 3 is for wear inhibition of the floor covering main body 2 in a case where the surface protective layer 4 is worn off, or for making the surface protective layer 4 less likely to be removed.

In the present invention, the surface layer 3 contains a thermoplastic resin and a plasticizer.

The thermoplastic resin includes vinyl chloride resins, olefin resins, vinyl acetate resins, acrylic resins, amide resins, ester resins, various elastomers, rubbers, and the like, and the vinyl chloride resins are preferred, from the viewpoint of flexibility, processability, durability, costs, and the like. As the vinyl chloride resins, paste-form vinyl chloride resins, suspension vinyl chloride resins, and the like are used. The thermoplastic resin may be used alone or in two or more kinds.

The content of the thermoplastic resin in the surface layer 3 is, but not particularly limited to, preferably from 45 to 90% by mass, more preferably from 50 to 80% by mass, and even more preferably from 65 to 75% by mass.

The content of the plasticizer, based on 100 parts by mass of the thermoplastic resin, is 20 parts by mass or more, preferably 25 parts by mass or more, and more preferably 28 parts by mass or more, from the viewpoint of flexibility, and the content is 50 parts by mass or less, preferably 40 parts by mass or less, and more preferably 35 parts by mass or less, from the viewpoint of inhibiting bleed-out. In other words, the content of the plasticizer, based on 100 parts by mass of the thermoplastic resin, is from 20 to 50 parts by mass, preferably from 25 to 40 parts by mass, and even more preferably from 28 to 35 parts by mass.

The plasticizer at least contains a benzoic acid ester-based plasticizer.

The benzoic acid ester-based plasticizer includes diethylene glycol dibenzoate, dipropylene glycol dibenzoate, propylene glycol dibenzoate, and the like. The benzoic acid ester-based plasticizer may be used alone or in two or more kinds. For example, as the benzoic acid ester-based plasticizer, a mixture of diethylene glycol dibenzoate and dipropylene glycol dibenzoate is used, from the viewpoint of plasticization efficiency, processability, costs, and the like.

The content of the benzoic acid ester-based plasticizer in the plasticizer is 10% by mass or more, preferably 25% by mass or more, and more preferably 30% by mass or more, from the viewpoint of inhibiting bleed-out, and the content is 80% by mass or less, preferably 50% by mass or less, and more preferably 40% by mass or less, from the viewpoint of flexibility. In other words, the content of the benzoic acid ester-based plasticizer in the plasticizer is from 10 to 80% by mass, preferably from 25 to 50% by mass, and more preferably from 30 to 40% by mass.

The plasticizer other than the benzoic acid ester-based plasticizer is preferably a phthalic acid ester-based plasticizer. The phthalic acid ester-based plasticizer includes di-2-ethylhexyl phthalate (DOP), dibutyl phthalate, dihexyl phthalate, diisononyl phthalate, and the like, and di-2-ethylhexyl phthalate (DOP) is preferred, from the viewpoint of flexibility enhancement, plasticization efficiency, costs and the like.

The plasticizer other than the benzoic acid ester-based plasticizer may be used alone or in two or more kinds.

The content of the phthalic acid ester-based plasticizer in the plasticizer is preferably 10% by mass or more, more preferably 25% by mass or more, and even more preferably 50% by mass or more, from the viewpoint of flexibility, and the content is preferably 85% by mass or less, more preferably 75% by mass or less, and even more preferably 70% by mass or less, from the viewpoint of inhibiting the bleed-out. In other words, the content of the phthalic acid ester-based plasticizer in the plasticizer is preferably from 10 to 85% by mass, more preferably from 25 to 75% by mass, and even more preferably from 50 to 70% by mass.

Besides them, the plasticizer other than the benzoic acid ester-based plasticizer includes phosphoric acid esters, chlorinated paraffin, trimellitic ester, dioctyl adipate (DOA), and the like. Among them, the plasticizer further contains dioctyl adipate (DOA) in an amount of preferably from 0.1 to 80% by mass, more preferably from 5 to 30% by mass, and even more preferably from 10 to 25% by mass, from the viewpoint of excellent flexibility under low temperatures.

The surface layer 3 can optionally contain an additive, and the additive includes a polymerization initiator, an anti-slipping agent, a filler, a flame retardant, a stabilizer, an antioxidant, a colorant, an antibactericidal agent, and the like.

The surface layer 3 may be transparent or nontransparent, and it is preferable that the surface layer is transparent to an extent that the designing of the floor covering main body 2 can be visually recognized, so that it is preferable that the constitution does not include a filler such as calcium carbonate, or substantially not containing the filler.

The thickness of the surface layer 3 is, but not particularly limited to, preferably from 0.1 to 1 mm, more preferably from 0.1 to 0.7 mm, and even more preferably from 0.2 to 0.5 mm.

The surface protective layer 4 is a layer which is positioned at an outermost front side of the floor covering, which is the layer protecting the floor covering.

The surface protective layer 4 contains a curable resin in which at least one of a curable monomer and a curable oligomer is polymerized.

The curable resin includes, for example, resins curable by heat, resins curable by ionizing radiation, resins curable by non-ionizing radiation, and the like. The ionizing radiation-curable resins are preferred, from the viewpoint of excellent processability and hardly likely to give thermal damages to the surface layer 3. The ultraviolet curable resins are more preferred, from the viewpoint of being widely available, The curable monomer or curable oligomer for a resin curable by heat includes monomers or oligomers, of acrylic, polycarbonate, polystyrene and the like.

The curable monomer or curable oligomer for a resin cured by ionizing radiation includes a curable monomer or curable oligomer for a resin which is cured by ultraviolet rays or electron beams. The curable monomer or curable oligomer which is cured by ionizing radiation is also hereinafter referred to an ionizing radiation-curable monomer or ionizing radiation-curable oligomer.

The ionizing radiation-curable monomer or ionizing radiation-curable oligomer includes monomers or oligomers having a polymerizable unsaturated binding group such as a (meth)acrylate group or a (meth)acryloyloxy group, or an epoxy group in the molecule.

Specific examples of the ionizing radiation-curable monomers include styrenic monomers such as α-methylstyrene, methyl (meth)acrylate, 2-ethylhexyl (meth)acrylate, dipentaerythritol hexa(meth)acrylate, dipentaerythritol penta(meth)acrylate, urethane (meth)acrylate, polyol compounds having two or more thiol groups in the molecule, and the like, and the monomers having a (meth)acrylate group in the molecule are preferred, and urethane (meth)acrylate is more preferred.

Specific examples of the ionizing radiation-curable oligomers include acrylates such as urethane (meth)acrylate, polyester (meth)acrylate, and epoxy (meth)acrylate, unsaturated polyesters, epoxy, and the like, and oligomers having a (meth)acrylate group in the molecule are preferred, and the urethane (meth)acrylate is more preferred.

The curable resin may be used alone or in two or more kinds.

A photopolymerizable initiator is usually added to the ionizing radiation-curable monomer or ionizing radiation-curable oligomer. The photopolymerizable initiator includes, for example, 2,2-dimethoxy-2-phenylacetophenone, acetophenone, benzophenone, xanthone, 3-methylacetophenone, 4-chlorobenzophenone, 4,4'-dimethoxybenzophenone, benzoin propyl ether, benzyl dimethyl ketal, N,N,N',N'-tetramethyl-4,4'-diaminobenzophenone, 1-(4-isopropylphenyl)-2-hydroxy-2-methylpropan-1-one, and other thioxantho-based compounds, and the like.

The surface protective layer 4 can optionally contain an additive, and the additive includes a solvent, a leveling agent, fine particles, a filler, a dispersant, a plasticizer, an ultraviolet absorbent, a surfactant, an antioxidant, a thixotropic agent, or a composition containing a curable resin, and the like.

The solvent includes alcohols, ketones, esters, ethers, glycols, CELLOSOLVE, aliphatic hydrocarbons, aromatic hydrocarbons, and the like. The solvent may be used alone or in two or more kinds.

The composition containing a curable resin includes a ultraviolet curable resin composition. Commercially available products include AULEX manufactured by Chugoku Marine Paints Ltd., ADEKA OPTOMER manufactured by Asahi Denka Kogyo K.K., KOEI HARD manufactured by Koei Chemical Company, Ltd., SEIKABEAM, manufactured by Dainichiseika Color & Chemicals Mfg. Co., Ltd., EBECRYL, manufactured by DAICEL-CYTEC, UNIDIC manufactured by DIC Corporation, SANRAD, manufactured by Sanyo Chemical Industries, Ltd., and the like.

The surface protective layer 4 may be transparent or nontransparent, and it is preferable that the surface protective layer is transparent to an extent that the designing of the floor covering main body 2 can be visually recognized.

The thickness of the surface protective layer 4 is, but not particularly limited to, preferably from 5 to 70 µm, more preferably from 10 to 150 µm, and even more preferably from 15 to 40 µm.

Since the floor covering of this embodiment further includes a surface protective layer 4, the floor covering has excellent anti-soiling property.

In addition, in a case where a surface protective layer 4 is provided as a plasticizer other than the benzoic acid ester-based plasticizer used in the surface layer 3, a polymerizable monomer or polymerizable oligomer that polymerizes to the curable monomer or curable oligomer of the surface protective layer 4 may be used.

The polymerizable monomer includes (meth)acrylic esters of polyhydric alcohols. The (meth)acrylic esters of polyhydric alcohols include trimethylolpropane (tri)acrylate, tetramethylolmethane tetra(meth)acrylate, 1,6-hexanediol (meth)acrylate, dipentaerythritol penta(meth)acrylate, and the like, and trimethylolpropane (tri)acrylate is preferred.

The polymerizable oligomer includes oligoester acrylate, polyester acrylates, epoxy acrylate, polyurethane acrylate, and the like.

In a case where a surface protective layer 4 is provided, if a plasticizer bleeds out from a surface layer 3, the plasticizer may pass through the surface protective layer 4 and bleed out to the surface of the surface protective layer 4. Because of the bleed-out plasticizer, the soil is more likely to deposit thereto, thereby resulting in worsening of the anti-soiling property of the floor covering. According to the surface layer 3 of this embodiment, since the surface layer has an effect of inhibiting bleed-out, the bleed-out of the plasticizer from the surface of the surface protective layer 4 can be inhibited, so that the anti-soiling property can be maintained over a long period of time.

In addition, the cohesion of the surface layer 3 and the surface protective layer 4 is improved by the effect of inhibiting bleed-out of the surface layer 3. Accordingly, after the placement of the floor covering of this embodiment on a lower basal side, a floor covering that would not cause removal between layers of the surface layer 3 and the surface protective layer 4 over a long period of time is obtained, even when the ambulating amounts are increased.

Further, since the surface layer 3 has flexibility, the bowing or roughness of the floor covering can be followed up in a state of maintaining cohesion between the surface layer 3 and the surface protective layer 4, whereby removal between the layers of the surface layer 3 and the surface protective layer 4 is less likely to be caused, so that the flexibility needed for a floor covering overall can also be maintained.

In the surface layer 3 of this embodiment, a total amount of the plasticizer is lowered, and further a benzoic acid ester-based plasticizer having a high solubility to the thermoplastic resin can be contained in a desired proportion, whereby the bleed-out of the plasticizer from the surface layer 3 can be inhibited while maintaining flexibility that poses no problems in workability.

The floor covering 1 of this embodiment can be produced, for example, in the following manner, and the floor covering can be produced by another production method as a matter of course.

The method for producing a floor covering 1 includes the steps of furnishing a resin-coated glass sheet, which serves as a shape stabilization layer 23, laminating an upper resin layer 25 on a top side of the resin-coated glass sheet, laminating a lower resin layer 22 on a bottom side of the resin-coated glass sheet, and heating and pressing the layers to integrate the upper resin layer 25, the resin-coated glass sheet, and the lower resin layer 22, and optionally including other steps.

The lamination and the integration of the upper resin layer 25, the resin-coated glass sheet, and the lower resin layer 22 may be carried out simultaneously and sequentially. The above lamination and integration include, for example, the following procedures (1) to (3).

(1) A laminate containing laminated layers of an upper resin layer 25, a resin-coated glass sheet, and a lower resin layer 22 is heated and pressed to integrate.

(2) A first laminate containing laminated layers of an upper resin layer 25 and a resin-coated glass sheet is heated and pressed to integrate, and further the first laminate and a second laminate containing a laminated layer of a lower resin layer 22 are heated and pressed to integrate.

(3) A first laminate containing laminated layers of a lower resin layer 22 and a resin-coated glass sheet is heated and pressed to integrate, and further the first laminate and a second laminate containing laminated layers of an upper resin layer 25 are heated and pressed to integrate.

In addition to the upper resin layer 25, the resin-coated glass sheet, and the lower resin layer 22, a basal layer 21, a decorative layer 24, and a surface layer 3, a surface protective layer 4 or the like is laminated, and the lamination of these layers may be carried out simultaneously with the lamination and integration of the upper resin layer 25, the resin-coated glass sheet, and the lower resin layer 22 as in the above (1) to (3), or before the lamination and the integration of the upper resin layer, the resin-coated glass sheet, and the lower resin layer as in the above (1) to (3), or after the lamination and the integration, as appropriate.

For example, an upper resin layer 25 is laminated to a top side of the resin-coated glass sheet that serves as a shape stabilization layer 23, and a lower resin layer 22 is laminated to a bottom side of the resin-coated glass sheet, and further a decorative layer 24 and a surface layer 3 are laminated on a top side of the upper resin layer 25, and a basal resin 21 is laminated on a bottom side of the lower resin layer 22. While being laminated, the laminated layers are passed through a pair of rollers to be subjected to heating and pressing, whereby each of the layers from the basal layer 21 to the surface layer 3 can be integrated. Further, an ionizing radiation-curable monomer or oligomer, which is a forming material of the surface protective layer 4 is coated with a roll coater or the like on a top side of the surface layer 3. The ionizing radiation is applied to the coated ionizing radiation-curable monomer or oligomer using an ionizing radiation irradiation apparatus, thereby obtaining a floor covering 1 in which the surface protective layer 4 is formed on an uppermost side.

Each of these steps may be carried out in a single production line, in series. Alternatively, one or more steps selected from the above steps are carried out in one line, and the remaining steps are carried out in one or more other lines. In addition, all of the steps mentioned above may be carried out by one individual, or alternatively one or more steps selected from each of the steps may be carried out by one individual, and the remaining steps may be carried out by another individual.

Thus, the floor covering of this embodiment can be obtained.

The thickness of the overall floor covering is, but not particularly limited to, preferably from 0.2 to 5 mm, and more preferably from 1 to 2.5 mm.

According to the floor covering of this embodiment, since the bleed-out of the plasticizer is inhibited while maintaining flexibility, the workability and the anti-soiling property are excellent.

EXAMPLES

Examples 1 to 6, and Comparative Examples 1 to 3

[Preparation of Floor Covering (Surface Layer)]

The floor covering (surface layer) was prepared according to the following procedures.

Materials were mixed in accordance with the blends as listed in Table 1 until the liquid components were sufficiently allowed to penetrate into the resin, further, the materials were dropped between two hot rollers set at 180° C., and mixed for 20 minutes. Next, the mixed materials were nipped so as to have a sheet-like form having a thickness of 0.5 mm using the two rollers set at 180° C., and the sheet-like form was cut into a size of a length of 20 cm and a width of 5 cm to give a surface layer material of the floor covering of each of Examples and Comparative Examples. Here, the numerical values of the blends as listed in Table 1 are expressed by mass ratios.

<Flexibility>

Figure 2:
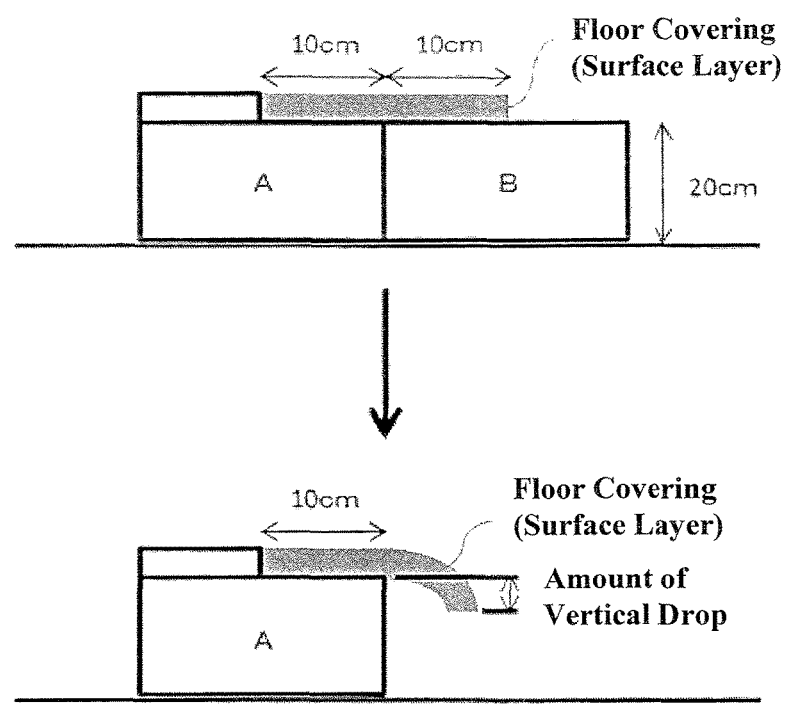
FIG. 2 are views for explaining a test method for flexibility.

The floor covering of each of Examples and Comparative Examples was positioned on blocks A and B as shown in the upper drawing of FIG. 2. From this state, the block B was removed as shown in the lower drawing of FIG. 2, and an amount of vertical drop after 30 seconds from removal was measured in an atmosphere at 5° C., and the flexibility was evaluated in accordance with the following criteria. The results are shown in Table 1.

◎: 25 mm or more
○: 15 mm or more and less than 25 mm
Δ: 10 mm or more and less than 15 mm
X: less than 10 mm <Bleeding Resistance>

The floor covering of each of Examples and Comparative Examples was placed in a gear oven, and heated at a set temperature of 200° C. for 3 minutes, and a weight reduction rate before and after heating was confirmed. The bleeding resistance was evaluated in accordance with the following criteria. The results are shown in Table 1. Here, the weight reduction rate was the results of calculation according to the calculation formula:

$$100 \times \frac{\text{Weight of Floor Covering After Heating}}{\text{Weight of Floor Covering Before Heating}}$$

TABLE 1

|  |  | Comp. Ex. 1 | Ex. 1 | Ex. 2 | Ex. 3 | Ex. 4 | Ex. 5 | Ex. 6 | Comp. Ex. 2 | Comp. Ex. 3 |
|---|---|---|---|---|---|---|---|---|---|---|
| Vinyl Chloride Resin | | 100 | 100 | 100 | 100 | 100 | 100 | 100 | 100 | 100 |
| Stabilizer | | 3 | 3 | 3 | 3 | 3 | 3 | 3 | 3 | 3 |
| Antibactericidal Agent | | 0.4 | 0.4 | 0.4 | 0.4 | 0.4 | 0.4 | 0.4 | 0.4 | 0.4 |
| Epoxy Soybean Oil | | 4 | 4 | 4 | 4 | 4 | 4 | 4 | 4 | 4 |
| Plasticizer | Conventional Plasticizer DOA | 0 | 0 | 0 | 2 | 4 | 6 | 0 | 0 | 0 |
| | Conventional Plasticizer DOP | 30 | 25 | 20 | 18 | 16 | 14 | 10 | 0 | 0 |
| | Benzoic Acid Ester-Based Plasticizer | 0 | 5 | 10 | 10 | 10 | 10 | 20 | 30 | 35 |
| Content of Benzoic Acid Ester-Based Plasticizer in Plasticizer (%) | | 0 | 17 | 33 | 33 | 33 | 33 | 67 | 100 | 100 |
| Flexibility | | ◎ | ◎ | ○ | ○ | ◎ | ◎ | Δ | X | X |
| Bleeding Resistance | | X | Δ | ○ | ○ | ○ | Δ | ◎ | ◎ | ◎ |

◎: less than 0.4%
○: 0.4% or more and less than 0.6%
Δ: 0.6% or more and less than 0.8%
X: 0.8% or more The details of each of the raw materials in each of Examples and Comparative Examples are as follows. Here, the amount as listed in Table 1 is not the amount of commercially available products, but the amount of each component (amount of active component).

Vinyl Chloride Resin "ZEST 800Y, manufactured by Shin-Daiichi Embi"

Stabilizer "NPS309, manufactured by ADEKA Corporation"

Antibactericidal Agent "KM10D manufactured by SHI-NANEN CO., LTD."

Epoxy Soybean Oil "T4000 manufactured by Sanwa Kasei Kogyo Co., Ltd."

DOA "manufactured by J-PLUS"

DOP "manufactured by J-PLUS"

Benzoic Acid Ester-Based Plasticizer "Velsiflex 320, manufactured by Velsicol Chemical, LLC"

When Comparative Example 1 is compared to each of Examples, it can be seen that the floor covering of each of Examples containing a benzoic acid ester-based plasticizer in an amount of 10% by mass or more in the plasticizer has excellent bleeding resistance.

When Comparative Examples 2 and 3 are compared to each of Examples, it can be seen that the floor covering of each of Examples containing a benzoic acid ester-based plasticizer in an amount of 80% by mass or less in the plasticizer has excellent flexibility.

In Examples, Examples 2 to 4 had excellent balance between flexibility and bleeding resistance, and especially Example 4 containing a proper amount of DOA was the most excellent.

The present invention is by no means limited to the embodiments and examples given above, and various embodiments can be taken within the range that would not depart from the spirit and scope of the present invention.

EXPLANATION OF NUMERALS

1 floor covering
2 floor covering main body
21 basal layer
22 lower resin layer
23 shape stabilization layer
24 decorative layer
25 upper resin layer
3 surface layer
4 surface protective layer

The invention claimed is:

1. A floor covering comprising:
   a floor covering main body and a surface layer provided on the floor covering main body,
   wherein the surface layer comprises a thermoplastic resin and a plasticizer component in an amount of from 20 to 50 parts by mass based on 100 parts by mass of the thermoplastic resin,
   wherein the plasticizer component comprises a mixture of diethylene glycol dibenzoate and dipropylene glycol dibenzoate in an amount of from 30 to 40% by mass, di-2-ethylhexyl phthalate in an amount of from 50 to 60% by mass, and dioctyl adipate in an amount of 10 to 20% by mass, and each of said recited amounts is relative to the total mass of the plasticizer component.

2. The floor covering according to claim 1, wherein the floor covering further comprises a surface-protective layer on the surface layer.

* * * * *